Jan. 2, 1968     R. P. CARROLL     3,361,231
HYDRAULIC AND POSITIVE BRAKING DEVICE
Filed March 15, 1965     7 Sheets-Sheet 1
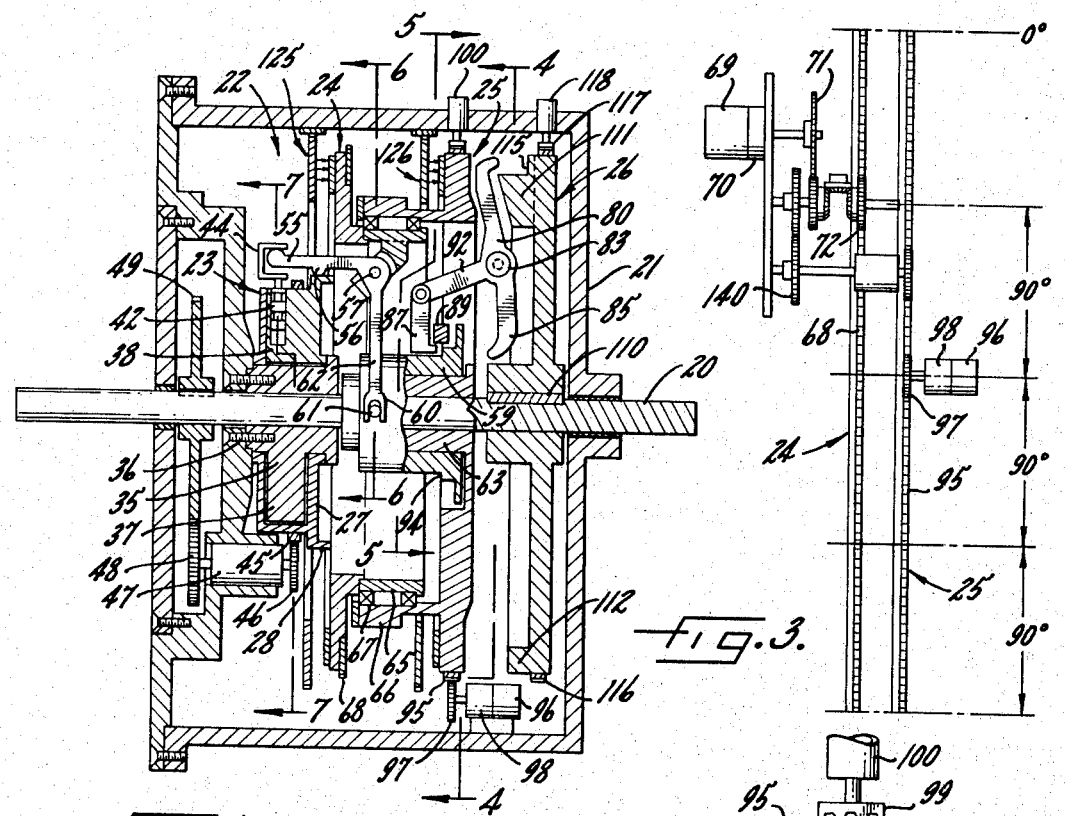
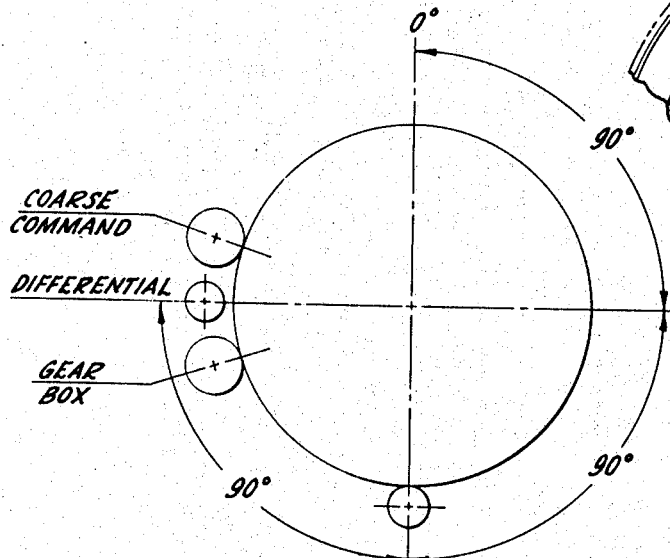
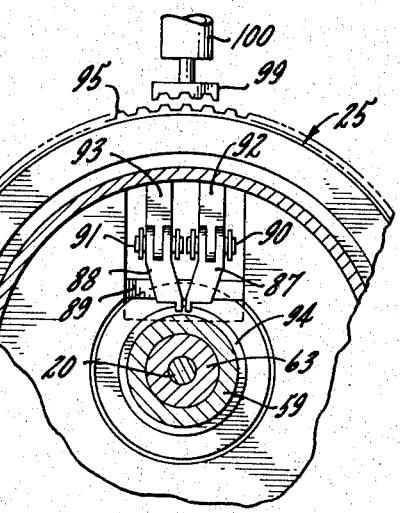
INVENTOR.
Robert P. Carroll,
BY Parker & Carter
ATTORNEYS.

Jan. 2, 1968  R. P. CARROLL  3,361,231
HYDRAULIC AND POSITIVE BRAKING DEVICE
Filed March 15, 1965  7 Sheets-Sheet 3

360° TIME – FUNCTIONS

| COMPONENTS ↓ / FUNCTIONS → | START CYCLE | POSITIONING | ERASE | PROCESS | DIRECTION SENSE | | | | PILOTING | |
|---|---|---|---|---|---|---|---|---|---|---|
| STEPS → | 1 | 2 | 3 | 4 | 5 | 6 | 7 | 8 | 9 | 10 |
| PROGRAM | ▨ | | | | | | | | | |
| CYCLE STEP MOTOR SUPPLY | ▨ | ▨ | ▨ | ▨ | ▨ | ▨ | ▨ | ▨ | ▨ | ▨ |
| ROTOR UNLOCK SOLENOID | | ▨ | | | | | | | | |
| PRIME MOTOR ON | | ▨ | | | | | | | | |
| LIMIT SWITCH | | ▨ | | | | | | | | |
| ERASE | ▨ | ▨ | ▨ | ▨ | ▨ | ▨ | ▨ | ▨ | ▨ | ▨ |
| STOP WHEEL SOL. UNLOCK | | | | ▨ | ▨ | ▨ | ▨ | ▨ | ▨ | ▨ |
| CW STOP RETRACT SOL. | | | | ▨ | ▨ | ▨ | ▨ | ▨ | ▨ | ▨ |
| CCW STOP RETRACT SOL. | | | | ▨ | ▨ | ▨ | ▨ | ▨ | ▨ | ▨ |
| PROCESS MOTOR ON | ▨ | | | ▨ | ▨ | ▨ | ▨ | ▨ | ▨ | ▨ |
| DIRECTION SENSING | | | | | ▨ | ▨ | ▨ | ▨ | | |
| COARSE AND FINE STEP MOTOR | | | | | | | | | ▨ | ▨ |

Fig. 9.

360° CYCLE STEP TIMING BARS

| STEP NAME → | START CYCLE | MOTION | ERASE | PROCESS | DIRECTION SENSE | | | | PILOTING | |
|---|---|---|---|---|---|---|---|---|---|---|
| STEP NUMBER | 1 | 2 | 3 | 4 | 5 | 6 | 7 | 8 | 9 | 10 |
| PROGRAM | 200 | | | | | | | | | |
| CYCLE STEP MOTOR | 204 | 209 | 224 | 230 | 242 | | | | 270 | ▨ |
| ERASE | | 220 | 221 | 220 | | | | | | |
| PROCESS | 231 | | | 231 | | | | | | |
| SENSE | | | | | 245 | 246 | 247 | 248 | 273 | 305 |
| PROGRAM | | | | | 249 | 250 | 251 | 252 | 274 | 306 |
| SENSE | | | | | | | | | 275 | 307 |
| PROGRAM | | | | | | | | | 276 | 308 |

Fig. 10.

INVENTOR.
Robert P. Carroll,
BY Parker & Carter
ATTORNEYS.

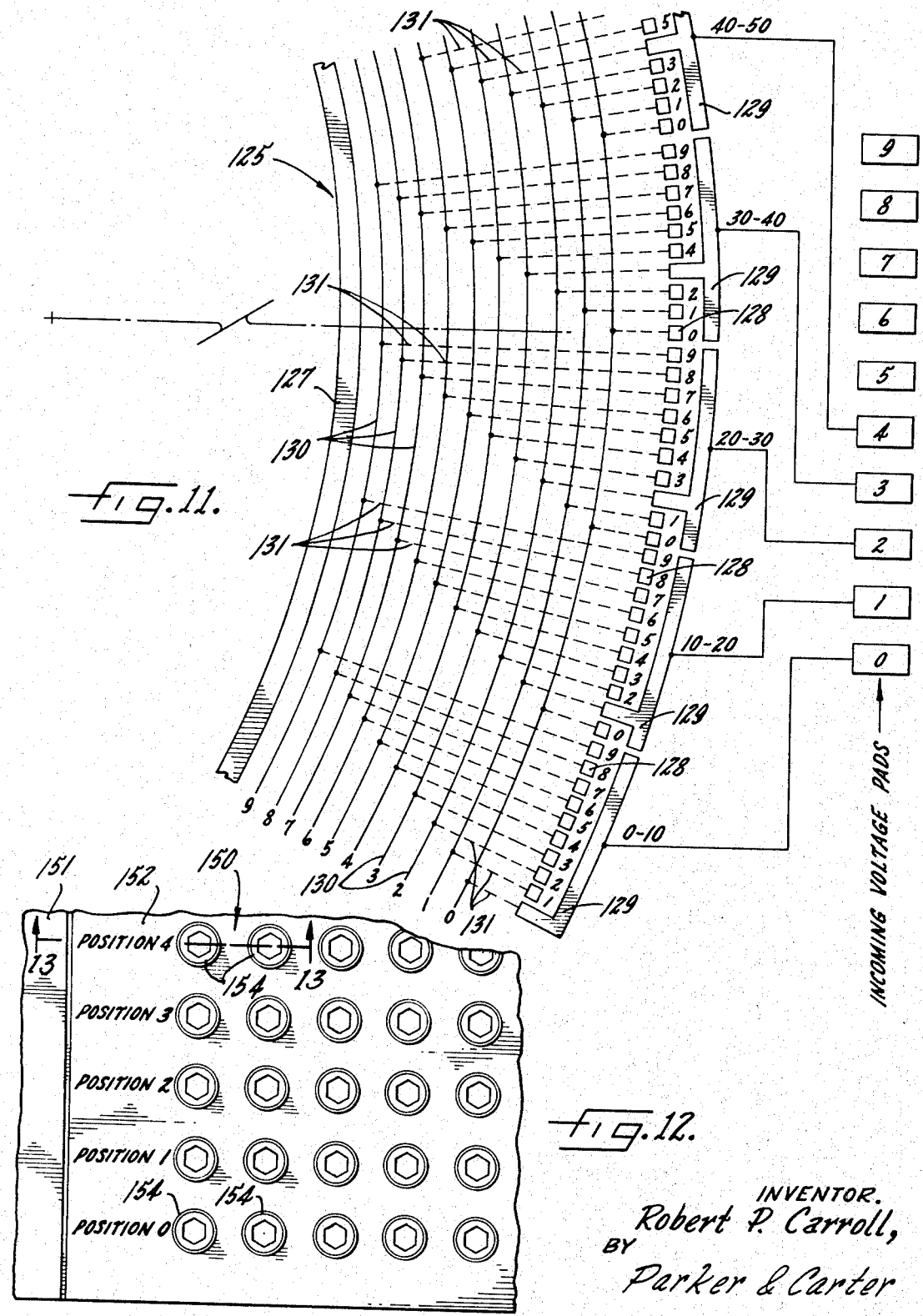

Jan. 2, 1968     R. P. CARROLL     3,361,231
HYDRAULIC AND POSITIVE BRAKING DEVICE
Filed March 15, 1965     7 Sheets-Sheet 5
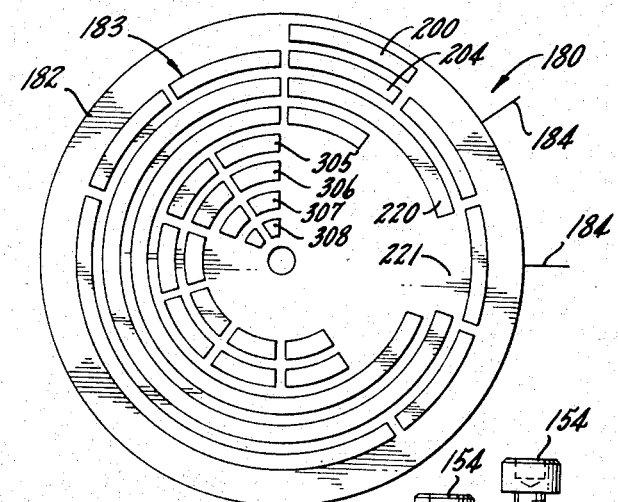
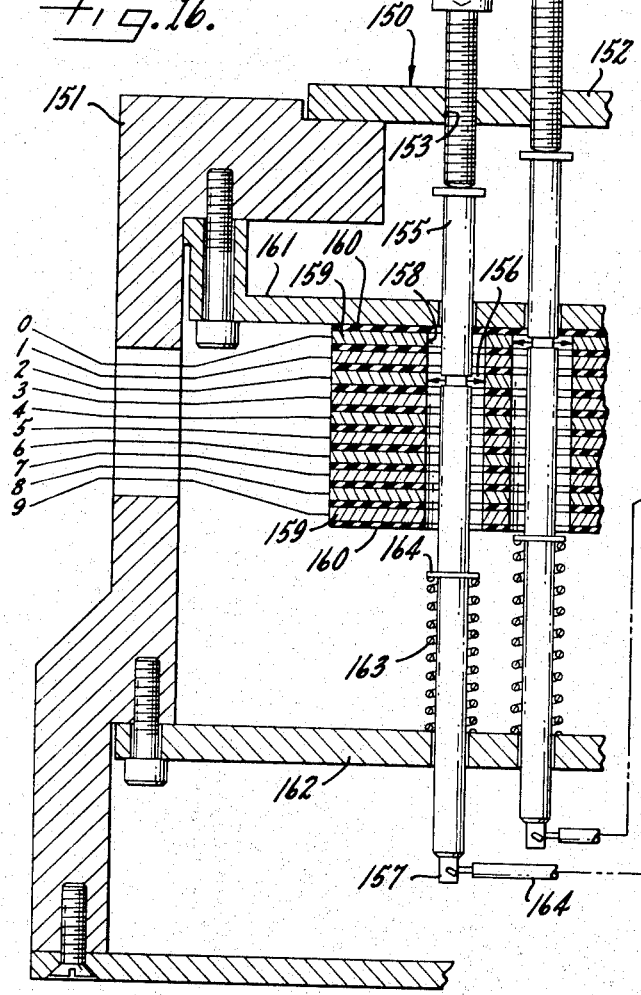
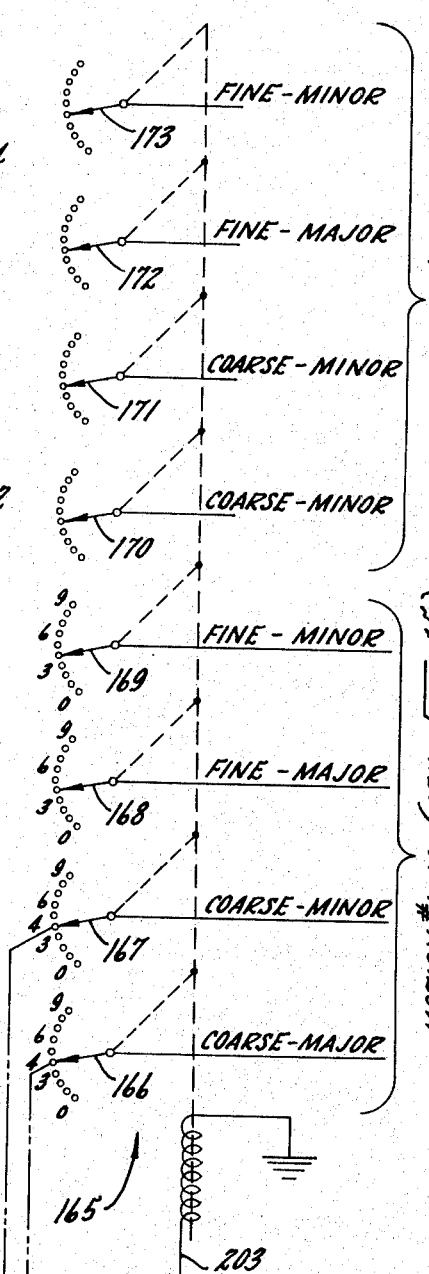
INVENTOR.
Robert P. Carroll,
BY Parker & Carter
ATTORNEYS.

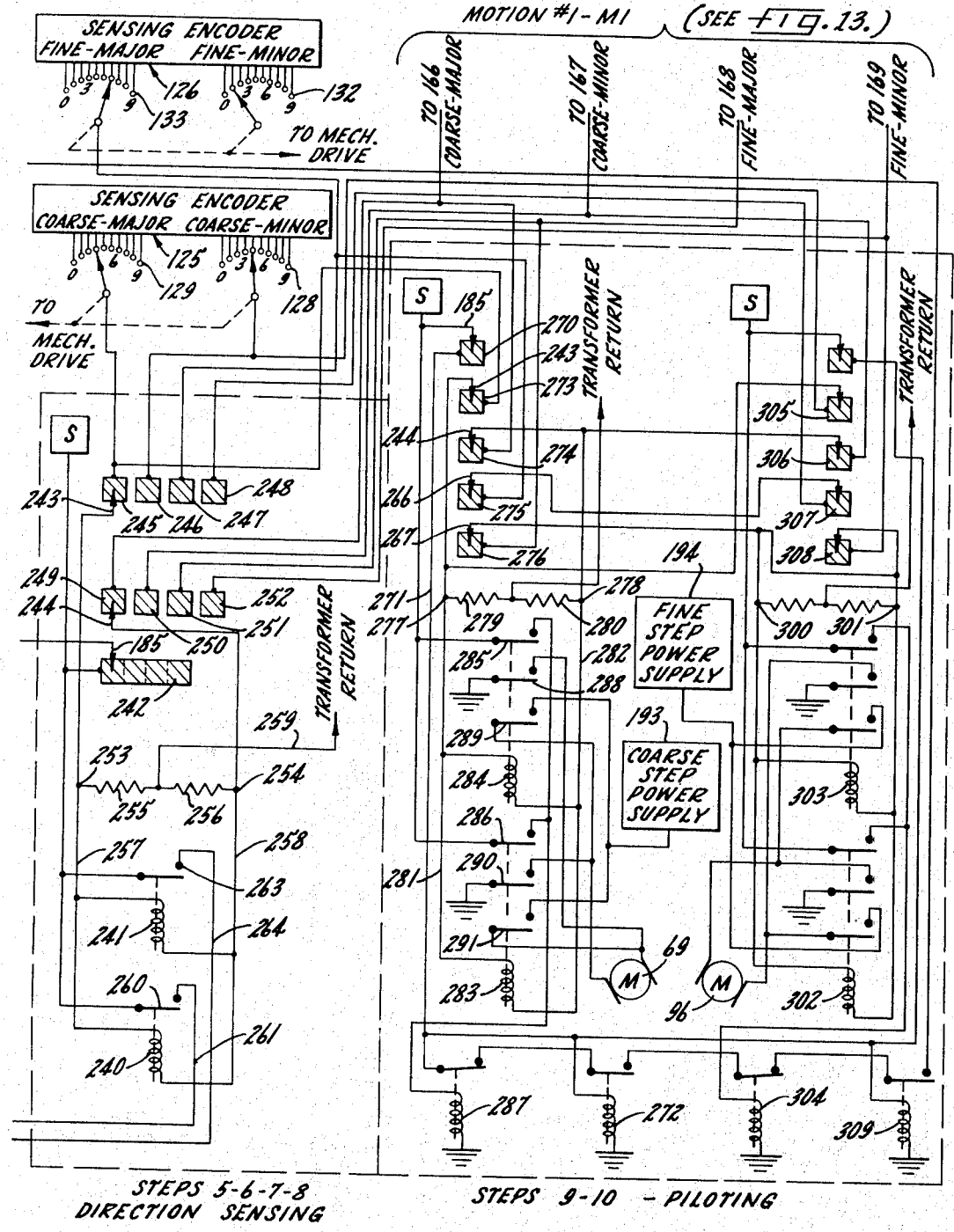

United States Patent Office 3,361,231
Patented Jan. 2, 1968

3,361,231
HYDRAULIC AND POSITIVE BRAKING DEVICE
Robert P. Carroll, 5442 East View Park,
Chicago, Ill. 60615
Filed Mar. 15, 1965, Ser. No. 439,693
5 Claims. (Cl. 188—86)

ABSTRACT OF THE DISCLOSURE

A programming control system for operating a machine through a sequence of point to point movements in which the control of the movements is accomplished by regulation of the direction and degree of rotation of a shaft driving the machine. A program apparatus is provided for producing groups of signals which are used to position a stopping mechanism of a combined hydraulic and frictional brake in order to stop rotation of the shaft after a predetermined amount of rotation in a predetermined direction. An indicator is provided to detect and indicate by signals the position of the stopping mechanism. Means are provided to reposition the stopping mechanism until the signals from the program apparatus and the signals from the indicator are equal. Means are provided to rotate the shaft in a preselected direction until stopped by the brake. Timing and switching apparatus and circuits are provided to run the program apparatus and stopping mechanism positioner through a predetermined sequence of steps.

---

My invention is concerned with a system for automatically controlling a machine through a sequence of movements of selected magnitude. It is more particularly concerned with control, recording and programming equipment suitable for governing the operations of processing and assembly machines.

A primary object of my invention is a system for controlling a sequence of point-to-point movements of a machine actuated by a power-driven rotating shaft through means of regulating the direction and degree of rotation of the shaft for each movement of the machine.

Another object is an apparatus for regulating the degree and direction of rotation of a power driven shaft through the use of groups of electrical signals of variable intensity.

Another object is a braking mechanism for stopping rotation of a power driven shaft at a selected amount or degree of rotation from a starting point after first slowing rotation of the shaft.

Another object is a braking mechanism which provides control of the motion or feed of the machine, precise and repeatable positioning of the load by means of a programmable stop, de-acceleration of the load prior to stopping, and locking of the load into an accurate detented position.

Another object is a program and memory apparatus for selecting the magnitude of each of a plurality of movements of a machine through means of adjustment of one or more screw type selectors for each desired movement of the machine.

Other objects will appear from time to time in the ensuing specification and drawings, in which:

FIG. 1 is a sectional view of the braking mechanism taken along the shaft;

FIG. 2 is a schematic view of drive gears of the positioning mechanism of the braking mechanism;

FIG. 3 is a developed diagram of the drive gears of FIG. 2;

FIG. 5 is a partial view taken along line 5—5 of FIG. 1;

FIG. 9 is a chart showing the components and functions of the apparatus of the invention;

FIG. 10 is a chart showing the cycle step timer conductor bars arranged in a rectilinear form;

FIG. 11 is an enlarged partial view of a position indicator encoder of the braking mechanism;

FIG. 12 is a partial plan view of the program apparatus;

FIG. 13 is a partial view taken along lines 13—13 of FIG. 12 and a schematic diagram of the program step switch;

FIG. 15 is a schematic diagram of part of the wiring circuit of the apparatus; and FIG. 16 is a plan view of the cycle step timer.

Figure 4:
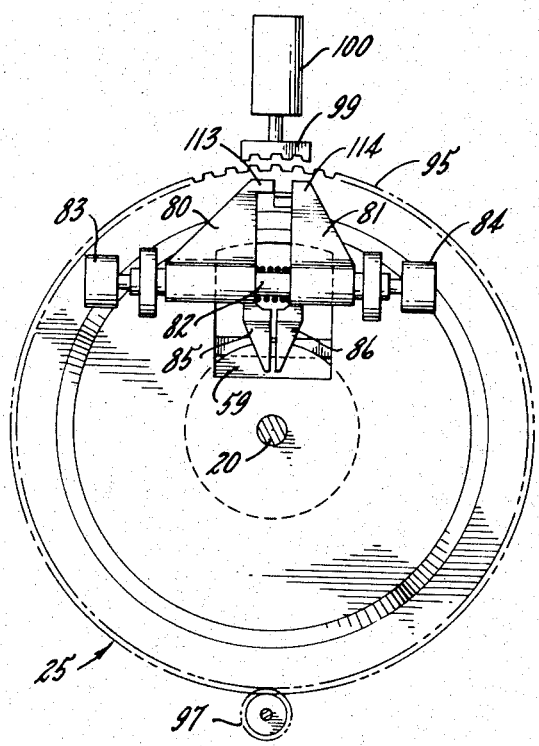
FIG. 4 is a view taken along line 4—4 of FIG. 1.
Figure 6:
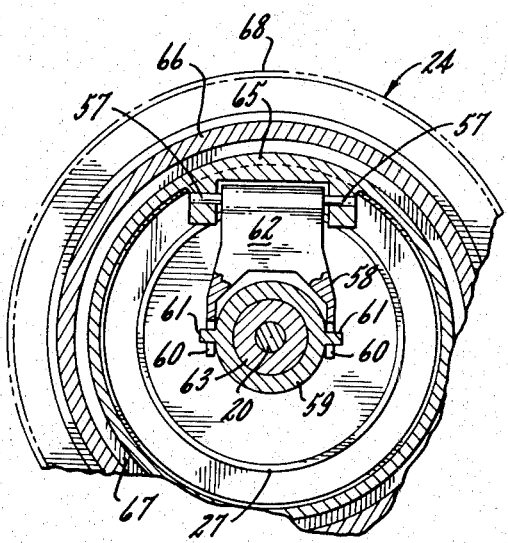
FIG. 6 is a partial view taken along the line 6—6 of FIG. 1.
Figure 7:
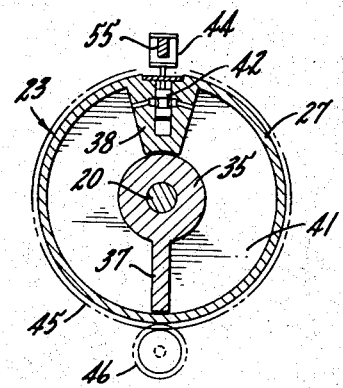
FIG. 7 is a reduced view taken along line 7—7 of FIG. 1.
Figure 8:
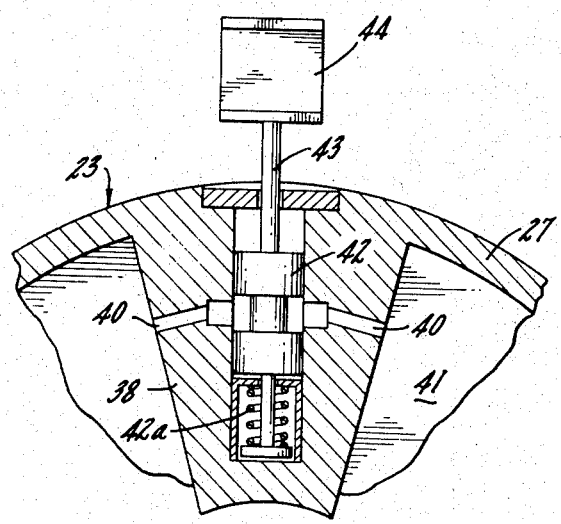
FIG. 8 is an enlarged partial view of the mechanism of FIG. 7.

For purposes of illustration, the invention is shown as applied to a power-driven rotatable shaft. It is also assumed for purposes of illustration, but not shown except in the wiring diagrams, that the driving mechanism for the shaft is an electric motor, although it could also be an air or hydraulic motor, and the invention could be adapted to an air cylinder or a hydraulic cylinder drive. The load connected to the rotatable shaft, which load also is not shown, can take many forms but, for purposes of explanation, it will be assumed that the load is a table driven by a lead screw having a pitch of ten threads per inch.

In FIG. 1, the power-driven shaft 20 is shown extending through a housing 21. This shaft can be power driven in clockwise and counterclockwise rotation. Within this housing are elements collectively indicated as 22, which form the braking mechanism. This braking mechanism includes a hydraulic brake 23, a cam follower arm supporting wheel 24, a stop engaging arm supporting wheel 25 and a stop supporting wheel 26, all of which are spaced relative to each other along the power-driven shaft 20. Formed as part of the hydraulic brake is a housing 27 having a flange 28 which functions as a cam surface.

The hydraulic brake 23 is in the form of a rotary cylinder and piston. A stator 35 is located in the housing 27 and has an annular portion which fits around the shaft 20 and is fixed relative to the housing 21 by means of fastening elements 36. Formed as part of the stator is an arm 37 which extends radially and outwardly from the annular portion to engage the walls of the brake housing 27 in a fluid-tight contact. The brake housing has an upwardly extending integral vane 38 which sweeps the annular portion of the stator in fluid-tight engagement throughout rotation of the housing 27 about the stator in the manner of a piston. A passage 40 extends through the vane to permit flow of hydraulic fluid 41, which fills the housing, through the vane as the vane and housing are rotated about the shaft and relative to the stator. Flow of the hydraulic fluid through the passage 40 is controlled by a plunger valve 42, which can be moved radially outwardly and inwardly of the housing to close and open the passage. The plunger valve is normally held open by spring 42a. When the passage is closed, the hydraulic fluid is trapped between the vane and the stator to stop rotation of the vane and housing relative to the shaft. A rod 43 connected to the plunger valve 42 extends outwardly of the housing and connects to a bracket 44. Radial and outward movement of the bracket moves the plunger valve radially of the housing and against the spring 42a to close the passage.

The housing 27 can be rotated from a first limit position where the vane 38 is adjacent one side of the stator arm 37 to a second limit position where the vane is adjacent the opposite side of the stator arm. In this arrangement the vane functions as a rotary piston. The relative movement of the stator and the vane can be stopped at any point in between by moving the plunger valve 42 radially to shut off the flow of hydraulic fluid 41 through the passage 40 in the vane. The brake housing 27 is rotated through means of a ring gear 45 located on the housing which is engaged by a drive gear 46. The drive gear is driven through a reduction gear 47, which in turn is connected to the main power shaft 20 by gears 48 and 49, with gear 49 being keyed to shaft 20. The reduction gear 47 is chosen for the desired travel of the load so that the brake housing 27 and cam flange 28 rotate somewhat short of a complete revolution, or in the neighborhood of 330° while the shaft completes sufficient revolutions to move the load through its desired travel distance. If a lead screw with a pitch of ten turns per inch is selected and the load is to travel 20 inches, then the shaft 20 must rotate 200 revolutions to move the load 20 inches. If the cam wheel or flange 28 and brake housing 27 are to turn 330 degrees during the same period, the gear reduction 47 must be $\frac{1}{20} \times \frac{1}{10} \times \frac{330}{360}$ or $\frac{1}{218}$.

Movement of the plunger valve 42 of the hydraulic brake 23 between opening and closing positions of the passage 40 is actuated by movement of an arm 55 relative to the brake housing 27. When the braking mechanism 22 is not actuated, the valve 42 and bracket 44 are held in a radially inward position by the spring 42 and in this position of the valve the passage 40 is open. The arm 55 is pivotally mounted on wheel 24 radially of shaft 20 at 57, and held in a position generally parallel to the shaft 20 by the combined action of a spring (not shown), which urges the arm towards the housing 27, and the engagement of a cam follower 56 on the arm with the cam flange 28, which limits movement of the arm toward the housing. In this position, the arm is radially spaced from the shaft the same distance as the spacing of the bracket 44 from the shaft in the open position of valve 42. With this spacing of the bracket and arm, the bracket will be rotated in an arc which includes the arm and will be moved into engagement with the arm shortly before the cam contacts the cam follower on the arm. Engagement of the cam with the cam follower will move the arm, and in turn the bracket 44, radially and outwardly of the shaft to close the passage 40. Formed integrally with the arm 55 as the opposite leg of an L-shaped member 62 is a bifurcated arm 58 which extends from the pivot point 57 at right angles thereto to straddle a collar 59 which is telescopically mounted on a hub portion 63 of the wheel 25. The bifurcated portions of the arm 58 divide into yokes 60 which engage pins 61 extending radially and outwardly from the collar 59. Rotational movement of the arm 55 about the pivot point 57 in a clockwise direction as seen in FIG. 1 moves the yoke portions 60 of arm 58 which engages the pins 61 to slide the collar 59 along the hub portion 63 and the shaft 20.

The cam follower arm support wheel 24 is journalled in and supported by the stop engaging arm supporting wheel 25, which in turn is rotatably journalled on the power-driven shaft 20 by its hub portion 63. The wheel 24 is journalled in the wheel 25 by means of an annular ring 65 which extends axially of the wheel 24 and into an axially extending annular ring 66 of the wheel 25. To reduce friction during rotation of these annular rings relative to each other, a bearing 67 is installed between the rings. A ring gear 68 is fastened to the wheel 24, and is driven by a stepping motor 69 through reduction gearing 70 and gears 71 and 72. FIG. 3 shows a developed view of the stepping motor and gear arrangement. The stepping motor and gearing are utilized to rotate wheel 24 and its supported cam arm 55 relative to the cam on flange 28 of the brake housing 27.

Mounted on the wheel 25 for pivotal movement axially toward and away from the wheel are a pair of stop engaging arms 80 and 81. These arms are mounted for rotation about a transversely extending shaft 82 supported on the wheel 25 and are spring urged toward the stop supporting wheel 26. To hold the arms in their retracted positions shown in FIG. 1, a pair of rotary solenoids 83 and 84, attached to the wheel 25, are provided. Extending oppositely from and rigid with arms 80 and 81 are arms 85 and 86 which are positioned on the opposite side of the pivot shaft 82 from arms 80 and 81. With the opposed arms on opposite sides of the pivot, movement of the arms 80 and 81 toward the stop supporting wheel will bring about movement of the arms 85 and 86 towards the sleeve 59. The arms 85 and 86 are proportioned to engage the sleeve 59 as the arms 80 and 81 are fully extended toward wheel 26.

In addition to the locking action of the solenoids 83 and 84, rotation of the arms 80, 85 and 81, 86 are restrained by engagement of their respective latch arms 87 and 88 with a transversely extending latch member 89 which is affixed to the wheel 25. Latch arms 87 and 88 are spring urged in a counterclockwise direction as viewed in FIG. 1 and are pivotally conected, respectively, by shafts 90 and 91 to crank arms 92 and 93, which are connected in turn to the arms 80 and 81 adjacent the pivot shaft 82. Release of the latch arms 87 and 88 from the latch 89 permits rotation of the arms 80 and 81 towards the stop supporting wheel 26 and into the path of rotation of a stop 111 mounted on this wheel.

When the cam arm 55 is rotated by engagement of the cam on flange 28 with the follower portion 56 of the arm, the bifurcated arm 58 of the L-shaped member 62 is also rotated to move the sleeve 59 along the hub 62 on the shaft 20 and toward the brake housing 27. Movement of this sleeve towards the housing 27 moves a collar portion 94 of the sleeve into engagement with the latch arms 87 and 88, releasing them from the latch member 89. With the latch arms released, the stop engaging arms 80 and 81 are free to move toward the stop supporting wheel 26 under the influence of their springs upon the deactivation of their respective rotary solenoids 83 and 84. The normal operation of the mechanism requires that only one of these solenoids be deactivated, so that only one stop engaging arm will be moved toward the stop supporting wheel 26.

A ring gear 95 is affixed to the periphery of the stop engaging arm wheel 25 and this wheel is rotated by a stepping motor 96 through the means of a spur gear 97 which engages the ring gear. The stepping motor operates through a reduction gear 98. To lock the wheel 25 in any desired position of rotation, a spring loaded jaw brake 99 is provided to engage the ring gear. The jaw brake is held out of engagement with the ring gear upon activation of a solenoid 100 connected to the brake.

The stop supporting wheel 26 is fixed to the shaft 20 by means of a key 110. The axially projecting stop member 111 is carried near the periphery of the stop supporting wheel 26 on the side of the wheel facing the stop engaging arms 80 and 81. Also formed as part of the stop supporting wheel 26 is a cam surface 112 located at the periphery of the wheel and also on the side facing the stop engaging arms. The outward tips 113 and 114, respectively, of the arms 80 and 81, ride on this cam surface. A depression 115 in this cam surface located adjacent the stop member 111 defines the maximum pivotal position of the stop engaging arms 80 and 81 away from the support wheel 25. Rotation of one of the stop engaging arms to this maximum position causes one of the depending and oppositely extending arms 85 and 86 to move the sleeve 59 along the shaft 20. This movement of the sleeve rotates the arms 58 and 55 of the L-shaped member 62 in a clockwise direction, as seen in FIG. 1, to move the plunger valve 44 to its closed position and stop rotation of the shaft 20. A ring gear 116 is attached to the peripheral edge of the circuits for comparison of these signals, both for direction and magnitude, are provided. Along with these comparison circuits, other circuits for such functions as energizing the prime mover for the shaft 20, driving the step motors and supplying power for processing the load, are provided.

The sequential operation of the electrical circuits through one complete cycle of operation of the machine for each level on the program step switch 165 is accomplished by a printed circuit cycle step timer 180 which is driven by a cycle step motor 181. The step motor is much faster and longer-lived than a cam switch, which could also be utilized and additionally has more switching capacity. The cycle step timer is assisted by fourteen common relays located in the various circuits. Most of the relays perform logic functions, and could be reed relays for small size and high speed operation.

The printed circuit cycle step timer shown in FIG. 16 is made up of a printed circuit board 182, in the shape of a disc, and having a plurality of conductors or timing bars 183 arranged in concentric annular bands or paths on one face of the disc. These conductors are depicted in a rectilinear form in FIG. 10 of the drawing. Conductors 184 lead from the timing bars through the board and to the circuits shown in FIGS. 14 and 15. The cycle step timer 180 is equipped with one brush for each conductive band or path thereon, and each of these brushes is connected to a source of relay power. The sources of relay power are indicated by an S in a square in the steps of FIGS. 14 and 15.

The cycle step timer is divided circumferentially into divisions, with the number of divisions being equal to the number of steps in a cycle of operation of the system. Some of the conductive paths 183 are interrupted at the divisions, while others will be continuous through the divisions, depending upon the function that each conductive path is to perform. When a cycle step timer brush is moved by the step motor into contact with a timing bar in a particular step, voltage is supplied by the brush from the relay supply source to the timing bar in the conductive path being contacted by the brush and electrical circuit to the step motor is interrupted. After the circuits connected to the timing bars of the particular step of the step timer have performed their functions, the electrical circuit to the cycle step motor is completed, and the brushes are moved to the next division or step on the cycle step timer, after which the same sequence is repeated. In each complete cycle of the cycle step timer, a circuit is provided to operate the program step switch 165, and move the individual levels of the program switch to another position of the program until all of the positions on the program have been utilized.

Figure 14:
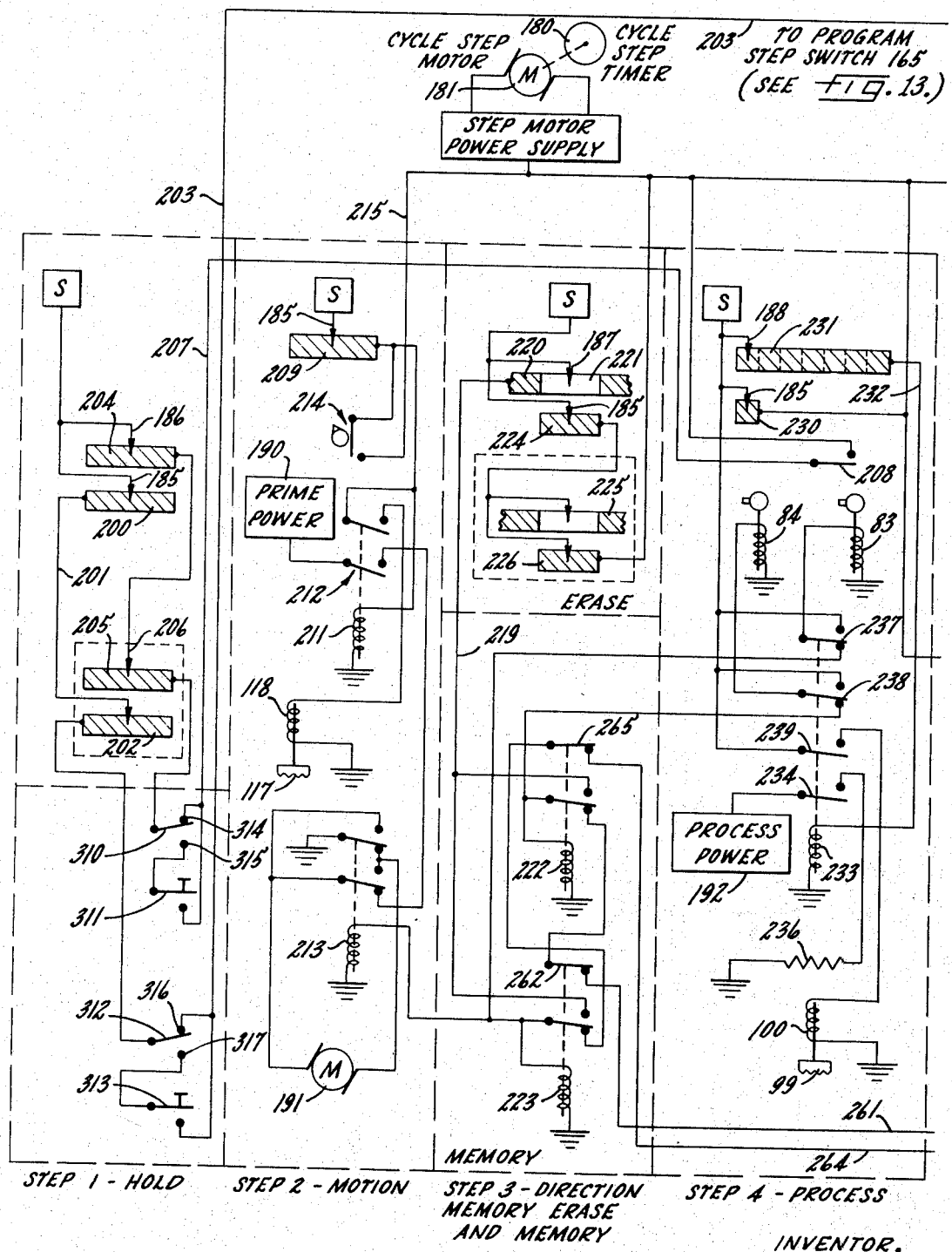
FIG. 14 is a schematic diagram of part of the wiring circuit of the apparatus.

The various circuits provided for operation of my machine control system include a cycle start circuit, a circuit for energizing the drive motor for the shaft 20, an erase circuit for the rotation direction memory for the shaft, a circuit to provide power for processing or whatever manipulation is to be done to the load after the shaft 20 moves the load into its desired position, a direction sensing circuit for determining the direction of positioning of the wheels 24 and 25 of the braking mechanism, and a piloting circuit for moving the wheels 24 and 25 into their desired position. Connected in these circuits are a source of prime power 190 for the driving motor 191 for the shaft 20, a source of process power 192, a source of power 193 for stepping motor 69, and a source of power 194 for stepping motor 96. In addition to this equipment, a number of relay switches as shown in FIGS. 14 and 15 are provided. This switching apparatus will be more fully described in the following section devoted to the use, operation and function of my invention.

The use, operation and function of my invention is as follows:

In setting up my machine control system it is necessary to select the magnitude of each movement of the load by adjusting the screws 154 of the program 150 for each motion and each position of the load. When the screws are adjusted for the desired motions and positions of the load, the control system can be operated through a cycle of the cycle step timer for each position of the program, with the switching from one position on the program to the next being under the control of the program step switch 165. For purposes of illustration, a typical cycle of operation of the control system will be described. For clarity, the cycle described will be for one of the intermediate positions (position 4) of a particular program. Also, for simplicity of explanation a program having only one motion (M1) in each position will be described. It will be assumed that the machine has already been operated through cycles for several positions of the program and is now beginning a new cycle as indicated in FIG. 14, at step 1 of position 4.

Step 1, called the cycle start or hold step, has two functions, the first being the energization of the program step switch 165 so that levels 166, 167, 168 and 169 thereof can be moved into the next position of the program during Step 2. The second function is to move the cycle step timer brushes to the next division on the cycle step timer after completion of the cycle for a position of the program.

In Step 1, the stop supporting wheel 26 is locked relative to housing 21 by means of the jaw brake 117 which is spring driven against the ring gear 116 when the solenoid 118 is deenergized, as is the case in Step 1. The stop engaging arm supporting wheel 25 is free to rotate relative to the housing because its solenoid 100 is energized to withdraw the jaw brake 99 from the ring gear 95 and against its spring.

In FIGS. 14 and 15 the shaded areas represent printed circuit conductors while the arrows represent brushes. The electrical circuits of Step 1 operate as follows:

Voltage from the relay supply [S] is furnished to brush 185 of the cycle step timer, and when this brush is moved to the Step 1 division of the cycle step timer, it engages a timing bar 200 of an annular path on the timer designated as the program path. If a second motion (M2) is incorporated into the program, a conductor 201 is provided to transfer the voltage from timing bar 200 to timing bar 202 of the second motion, which in turn is connected to the program stepping switch 165 by conductor 203. When only one motion is provided in the program, a conductor leads directly from bar 200 to the program step switch. The program step switch 165 is of the backward or spring actuation type in which the contacts are transferred by spring action when the step switch solenoid is deenergized. The deenergization occurs in Step 2 because of the termination of the program conductor bar 200 on cycle step timer. Voltage is also supplied to the timing bar on the annular band entitled cycle step motor, and designated as 204, by brush 186. If a second motion is provided, voltage is transferred from bar 204 to bar 205 in the second motion by conductor 206. Voltage is then transferred through line 207 to a process completion switch 208 in Step 4, and thence to the cycle step motor 181 to energize the motor and move the brushes to Step 2 of the cycle step timer. It is assumed that the completion of the processing, such as drilling, milling, etc., will include the closing of a limit switch or other switch. Process completion switch 208 is this type of switch. If there is no second motion, the voltage would be transferred directly from bar 204 to switch 208.

When brush 186 has arrived on timing bar 204 of the cycle step timer indicating completion of a cycle for the first motion; when brush 206 has arrived on timing bar 205 indicating the completion of the cycle for the second motion; and when the completion of the processing cycle causes process completion switch 208 to close, then a circuit is completed through the step motor power supply to the cycle step motor 181 to move the brushes to Step No. 2.

The provision of two single pole double throw switches wheel 26, and a spring loaded jaw brake 117, held away from the ring gear by a solenoid 118, is mounted for engagement with the ring gear to lock the stop wheel in position of rest when the solenoid is de-energized.

The relative rotational positions of the cam follower arm support wheel 24 and the stop engaging arm support wheel 25 from a starting point can be determined by signal means and these signals can be utilized to rotate the wheels to selectable positions. These signals are arranged to vary directly with the angular location of each wheel from a selected starting position. To obtain these signals, electrical contact members, such as brushes, are mounted on one side of each wheel 24 and 25 near the periphery thereof with the brushes joined by conductors to an electrical signal measuring means to be described later. The brushes pick up the signals from annular printed circuit sensing encoders 125 and 126, which are positioned in the housing adjacent the brushes of the wheels 24 and 25.

A part of encoder 125 is shown in FIG. 11. On the surface of the encoder board, which can be made from any suitable nonconductive material, facing the brushes are printed three concentric annular paths of conductive material. The innermost path 127 is continuous and acts as a common return for the other paths. The remaining paths 128 and 129 are divided into segments with the outer path 129 containing 10 segments and the intermediate path 128 containing 100 segments, each of which is separate from the other segments. Each of the segments in the outer path is connected to a separate voltage pad of increasing voltage which are numbered from 0 to 9 in FIG. 11. The segments of the intermediate path 128 are connected to concentric conductors 130 printed on the same surface of the encoder board as the paths 127, 128 and 129. As indicated in FIG. 11, these conductors are numbered the same as the incoming voltage pads 0–9 from which they receive electrical voltage. The conductors 130 are joined to the incoming voltage pads by conductors 131 which run along the opposite surface of the encoder and connect to the segments of path 129. Each segment of path 128 has the same voltage as similar numbered segments of path 129. The voltages to the pads 0–9 are at successively increasing values so that the segments of path 129 and the segments of path 128 adjacent each segment of path 129 are of increasing voltage. An example of how the voltages can be arranged in this order is shown in the following graph:

| Bar— | Voltage |
|---|---|
| 0 | 55 |
| 1 | 60 |
| 2 | 65 |
| 3 | 70 |
| 4 | 75 |
| 5 | 80 |
| 6 | 85 |
| 7 | 90 |
| 8 | 95 |
| 9 | 100 |

The rotational position of the wheel 24 from a starting position will be determined by the engagement of its brushes with the segments of paths 128 and 129, with each brush picking up a voltage corresponding to the voltage of the segment of the path that it is in contact with. The angle of rotation measured by the segments of the outer path 129 are referred to as the major mode, and the angle of rotation of the wheel as indicated by the segments of the intermediate path 128 is referred to as the minor mode. The angular position of wheel 25 is determined in a similar manner. The signals from these paths are compared with signals which are preselected for each desired stopping position of the shaft 20. If there is a difference between the preselected signals and the position signals of the wheels, the wheels 24 and 25 are driven by their respective stepping motors 69 and 96 until the difference in voltage between the preselected signals and the signals picked up the brushes is reduced to zero. When this occurs, the stepping motors stop. The stepping motors drive the wheels so that the brush contacting the major mode moves at the rate of 10 steps per major mode segment, while the minor mode brush is moved from one minor mode segment to the next for each step of the motor.

An increase in the accuracy of the angular positioning of the wheel 24 is obtained by means of a differential gear assembly 140, which adds an increment of the rotation of wheel 25 to wheel 24. Since the adjustment of wheel 25 regulates one full revolution or less of the shaft 20, and since wheel 24 moves through approximately $1/_{218}$ of a revolution for each revolution of shaft 20, the reduction ratio of the differential should be set for this amount. Thus each adjustment of the wheel 25 is also reflected in the adjustment of the wheel 24.

The signals which are used to compare with the signals picked off of the printed circuit encoders 125 and 126 are selected on a program 150, shown in FIGS. 12 and 13. The program apparatus is made up of a housing 151, on which is mounted a plate 152 having a number of threaded openings 153 arranged in a geometric pattern as shown in FIG. 12. Each opening is adapted to receive a headed screw 154. Each screw bears against a selector rod 155 located in the housing. The selector rods are made of a conductive material, such as brass, and are insulated throughout their lengths except at a brush portion 156 located intermediate the ends of the rod and at a bottom terminal 157. Each selector rod extends through openings 158 in a laminated stack of alternately positioned electrical conductors 159 and electrical insulators 160. This laminated stack is attached to an upper guide plate 161 and is supported beneath the openings 153 by this guide plate. The selector rods 155 are held in lateral vertical alignment by the upper guide plate and by a lower guide plate 162. The selector rods are urged upwardly against the program screws by compression springs 163, which engage the lower guide plate and a collar 164 on each rod. The number of conductors in the stack is equal to the number of voltage pads connected to the printed circuit encoders 125 and 126. Conductors in the stack are numbered from 0–9 and each conductor in the stack has the same voltage as a segment of the same number on the printed circuit encoders. Each screw can be rotated to move its selector rod into contact with one of the ten conductors in the stack and deliver the voltage of the conductor to the terminal 157.

A conductor 164 leads from the terminal 157 of each selector rod to a stepping switch 165 shown in FIG. 13. All of the conductors from the selector rods for one position or group in the program, for example, group or position 0 as shown in FIG. 12, lead to the same one of the ten contacts, 0–9, shown for each level 166–173 of the stepping switch. One level on the stepping switch is assigned to each mode of the encoders 125 and 126. For instance, level 166 is assigned to the major mode of encoder 125, level 167 is assigned to the minor mode of encoder 125, level 168 is assigned to the major mode of encoder 126 and level 169 is assigned to the minor mode of encoder 126. The program 150 and the stepping switch 165 shown in FIGS. 12 and 13 is capable of controlling a machine in which two motions or movements (motion #1–M1 and motion #2–M2) are performed at each position. In such an arrangement, levels 166–169 of the stepping switch would be assigned to braking mechanism 22 and levels 170–173 would be assigned to a second braking mechanism 22' (not shown). Of course, the program can be modified to accommodate various numbers of motions and positions.

In order to compare the signals selected on the program 150 with the signals obtained from the sensing encoders 125 and 126 for each motion of the machine in each position, and to utilize the difference between these signals to operate the step motors 69 and 96, electrical 310 and 312 and two momentary contact switches 311 and 313 in the circuit of Step 1 permits the testing and adjustment of the screws 154 in each position of the program without operating the machine through a complete cycle for each position. When the switches 310 and 312 are engaging the upper contacts 314 and 316, the system is in its normal fully automatic operation. For manual operation, switches 310 and 312 are moved to the lower contacts 315 and 317. When adjusting the program, the switches 310 and 312 are placed in the manual position, and by means of momentary contact switch 313 the program switch 165 is manually stepped to the first position on the program. Adjustments are made in the screws 154 of this program position. The momentary contact switch 311 is then closed and the machine moves to the first position determined by the program. If adjustments in the positioning of the machine are necessary, the program screws can be adjusted again and the momentary contact switch 311 operated once more. Adjustments can be made in this manner until the operation of the machine in this position of the program is satisfactory. The momentary contact switch 313 can be operated in the same manner to move the program step switch to the remaining positions on the program where adjustments can be made in the same manner. With these switches, changes in the program necessitated by worn tools or changes in the products or processes can be effected by switching to manual operation, adjusting the screws for that position in the program and checking the corrected position by momentarily closing the contact switch 311.

In Step 2, called the motion step, the levels 166, 167, 168 and 169 of the program step switch 165 are transferred to the next position (in this example position 4) as its solenoid is deenergized when brush 185 passes off timing bar 200 on the cycle step timer. The stop engaging arm supporting wheel 25 is locked to the housing 21 by deenergizing its solenoid 100, causing the teeth on the jaw brake 99 to engage the teeth on the ring gear 95. The stop supporting wheel solenoid 118 is energized, unlocking this wheel. The stop engaging arms 80 and 81 are retracted out of the way of the stop lug 111 on the wheel 26. The operation of the circuits for this step is as follows:

With the arrival of brush 185 on timing bar 209, relay 211 is energized, causing both contacts of switch 212 to close. The closing of the top contact of the switch 212 opens a path which energizes the stop supporting wheel solenoid 118 and retracts the jaw brake 117 from engagement with ring gear 116 of this wheel. With the closing of the lower contact of the switch 212, power from the prime motor source 190 is supplied to the prime motor 191 which drives the shaft 20. The circuit connected to the lower contact of this switch runs through the prime motor direction control relay 213. The energization of this relay to control the direction of rotation of the prime motor is accomplished in Step 3 and will be described later. As the prime power motor drives the stop 111 up against the selected one of the two stop arms 80 or 81, stop limit switch 214 is closed, and a circuit 215 is completed to the cycle step motor 181, moving the brushes to the next division or step on the cycle encoder.

During rotation of the shaft 20 by the prime motor 191, the pump housing 27 and its integral vane 38 are being rotated relative to the fixed arm 37 through means of the gears and gear reduction 45, 46, 47 and 48, which are connected to the shaft 20 through gear 49. During this rotation, the valve 42 is in its open position permitting flow of the hydraulic fluid 41 through the passage 40 in the vane. When the pump housing 27 has been rotated by the gears through the preselected amount of rotation, the cam 28 engages the cam follower portion 56 of the cam arm 55 and rotates the cam arm. Rotation of the cam arm moves the bracket 44 radially and outwardly and moves the valve 42 to close the passage 40. Closing of this passage stops the flow of hydraulic fluid and the rotation of the vane 38 and its integral pump housing 27 relative to the stator 35 and arm 37 are stopped by the hydraulic fluid trapped between the stator and said arm. As the valve 42 is closing and restricting the passage 40 and thereby slowing the shaft, the upward or clockwise movement of the arm 55 is also bringing about clockwise rotation of the arm 58, which moves the pins 61 and slides the sleeve 59 along the hub 63 of the wheel 25 and the shaft 20.

Axial movement of this sleeve causes the collar portion 94 of the sleeve to engage the latch arms 85 and 86 to release these latch arms and permit movement of one of the stop engaging arms 80 or 81 under the influence of its torsional spring. The stop engaging arm will move into position to engage the stop 111 and bring the rotating shaft 20, slowed by the hydraulic braking mechanism 23, to a complete stop. Clockwise rotational movement of arm 80, one of the stop engaging arms, as seen in FIG. 1, for example, will also result in clockwise rotation of its opposed and depending arm 85 into engagement with the sleeve 59. Engagement of the arm with the sleeve will cause movement of the sleeve along shaft 20 which will, in turn, cause clockwise rotation of the L-shaped member 62, and closing of the valve 42 to slow and stop rotation of the shaft. The end portion 113 of the arm 80 is riding in the fine cam 115 of the wheel 26 and a few thousandths of an inch before the stop 11 engages the stop arm 80, a limit switch 214 is actuated to complete circuit 215 and move the cycle step motor brushes to the next division on the cycle encoder, which is Step 3.

The purpose of Step 3 is to erase the direction memory for rotation of the shaft 20 in preparation for the next direction sensing and piloting operations of Steps 5–10. With deenergization of the Step 2 circuits, the stop supporting wheel jaw brake solenoid 118 is deenergized, allowing the spring in the solenoid to move the jaw brake 117 into engagement with the teeth of ring gear 116 to lock the wheel 26 and the shaft 20 in their new positions. The deactivation of the Step 2 circuits also disconnects the source of power 190 for the drive motor 191 for the shaft 20.

The Step 3 electric circuits function in the following manner:

Voltage for the operation of the direction memory lock-up circuit is normally supplied through brush 187 of the cycle step motor 181 to the conducting path 220 of the cycle encoder 180. When the brushes arrive in the position on the cycle step timer for Step 3, brush 187 engages a non-conductive portion 221 of the path, interrupting the memory circuit 219 and allowing the memory relays 222 and 223 to open. The circuit to the cycle step motor is not opened in this step as the brush 185 contacts the path 224, which leads to the cycle step motor, and the cycle step timer brushes are driven directly to Step 4. In this step, relays 222 and 223 must release faster than the amount of time taken to move the step timer brushes through this step. If more than one motion is provided for each position in the program, an additional memory path and an additional step motor path for each additional motion are provided. Additional paths 225 and 226 for an additional motion are shown within the broken line square located in the Step 3 circuits.

The functions of Step 4 are to start the processing or whether is to be done to the load after positioning; to retract both of the stop engaging arms 80 and 81, and to unlock the stop arm supporting wheel 25. These functions are initiated by the movement of the brushes 185 and 188 of the cycle step timer 180 into engagement with the conductor path 230 for the cycle step motor and conductor path 231 for the process circuit. The relay power supply to path 231 goes through the conductor 232 to relay 233 to actuate the relay and close switch 234 to connect process power 192 to process load 236. The process conductor path 231 is continuous through Steps 4–10 and 1.

Energization of the relay 233 also closes switch 237 which energizes solenoid 83 of stop engaging arm 80 and switch 238 which closes the circuit to energize solenoid 84 for stop engaging arm 81. Operation of these solenoids retracts the arms 80 and 81 out of the way of stop lug 111 on wheel 26. Energization of relay 233 also closes switch 239 which operates solenoid of wheel 25, unlocking this wheel from the housing 21. As previously mentioned, the engagement of the cycle step timer brush 185 with conductor path 230 moves the cycle step timer brushes onto Steps 5–8 on the cycle step timer 180.

The purpose of the direction sensing Steps 5 through 8 is to compare the voltage chosen by each selector 154 in one position of the program 150, with the voltage picked up by its corresponding brush of the wheels 24 and 25 off of the segments of conductors 128, 129, 132 and 133 of their respective position indicator or sensing encoders 125 and 126. As previously mentioned, the amount of movement of the load determined by the angular positioning of wheel 24 is called the coarse adjustment and that determined by wheel 25 is called the fine adjustment. Also, as previously mentioned, each position indicator encoder has two segmentized bands of conductors, one of which is referred to as the major mode, and the other as the minor mode. The major mode is divided into ten conductive segments of varying voltage, and the minor mode is divided into 100 conductive segments arranged in groups of 10, with each group having the same sequence of voltages as those of the major mode. In the sensing encoder schematically depicted in FIG. 15, all of the conductive segments 129 and 133 of the major modes and a group of 10 of the conductive segments 128 and 132 of the minor modes are depicted, and are indicated by numbers from 0 to 9. The brushes of the wheels, depicted by arrows, are shown engaging the conductive segments to indicate a particular angular position as the sheet 20. The voltages picked up by these brushes are individually compared with the voltages indicated by each selector in a position of the program to determine the direction and amount of rotation of the shaft required to make the voltages of the brushes agree with the voltages selected on the program for that position.

The comparisons between the voltages of the selectors 154 and of the position indicator or sensing encoders are made in sequence in four steps, arranged as follows: Coarse, major mode; coarse, minor mode; fine, major mode; and fine, minor mode. If there is no voltage difference between the selector and the encoder in a particular comparison, then no direction sensing is accomplished for that particular mode. In the first measurement level in which there is a voltage difference, either the clockwise relay 240 or the counterclockwise relay 241 in the circuits of Steps 5, 6, 7 and 8 is locked up and this locks out the other relay.

The comparisons in the four modes for one position of the program 150 are accomplished by the electrical circuits and equipment in the following manner:

The operation of the cycle step motor 181 moves brush 185 into contact with path 242 of the cycle timer. This path is connected to the cycle step motor and extends throughout the divisions or Steps 5, 6, 7 and 8, so that the step motor continues to run through the steps without stopping. During the steps, the sense and program brushes 243 and 244 of the cycle step timer are moved into contact with their respective sensing conductor paths 245, 246, 247 and 248, and the program conductor paths 249, 250, 251 and 252 of the cycle step timer. Path 245 of the sensing encoder and path 249 of the program are located in Step No. 5, and these paths are respectively connected to the coarse major mode of the sensing encoder and the coarse major mode of the program. This comparison is accomplished by conducting the voltage of the segment of path 129 of the sensing encoder through path 245 on the cycle step timer by means of brush 243 and putting this in opposition at 253 with the voltage from level 166 of the program switch, which is conducted to path 249 on the cycle step timer and picked up by brush 224 and conducted to 254. These points in the circuits are connected by resistances 255 and 256. Depending on which voltage is larger, the sensing encoder or the program, the voltage will polarize in lines 257 and 258. The clockwise relay 240 is connected in opposite polarity to the counterclockwise relay 241. Therefore, the first relay to operate determines the polarity or direction that drive shaft motor 191 must turn to reach its next position. The power supply for the sensing or position locating encoder in the program is not shown, but is assumed to be by means of taps of a transformer which is rectified and switched through the cycle encoder, as shown in these diagrams. Line 259 shown in Steps 5–8 is the return to the secondary of the transformer.

As the cycle stepping motor 181 moves the brushes 243 and 244 through Steps 5, 6 and 7, the voltages of each mode of the sensing encoder and the program are compared in the same manner. During this movement, brush 243 engages conductive segments 246, 247 and 248, and brush 244 engages segments 250, 251 and 252.

The cycle step motor 181 moves without stopping through Steps 5, 6, 7 and 8, comparing the voltages between the modes of the sensing encoders 125 and 126 and the program 150, and, therefore, the clockwise relay 240 and counterclockwise relay 241 must be fast acting.

The operation of the clockwise and counterclockwise relays 240 or 241 sets up the memory program of Step 3 in the following manner: The closing of the contacts 260 of the clockwise relay 240 opens a path 261 to the clockwise lock-up relay 222 through the normally closed top switch 262 of the counterclockwise lock-up relay 223. Likewise, closing of the contact 263 of the counterclockwise relay 241 opens a path 264 to the energization of the counterclockwise lockup relay 223 through the normally closed top switch 265 of the top clockwise lock-up relay 222. It can be seen from this arrangement that the first lock-up relay to be energized locks open the path to the other lock-up relay, and thus determines the direction of rotation of the motor 191 and the shaft 20 to the next position. As was stated in Step 3, the voltage for energization of the direction relays goes through the erase brush and conductor 220, and is automatically erased when the cycle step timer goes through Step 3. Also, as mentioned before, the cycle step motor conductor path 242 of the timer 180 is continuous through Steps 5–8, and the path to the cycle step motor is not opened after the sensing operations, and the cycle step motor drive on to Steps 9 and 10.

The functions of Steps 9 and 10, which are the piloting steps, are to rotate the cam follower arm supporting wheel 24 and the stop engaging arm supporting wheel 25 to the shaft stopping position selected on the program 150. The piloting is done first in the major mode and then in the minor mode for each of the wheels. The rotation direction sensing is identical to that described in Steps 5 to 8, but in addition, the stepping motors 69 and 96 are operated to position the wheels. The piloting in the major and minor modes are performed in succession with the major mode first.

The functions of Steps 9 and 10 are performed as follows: The operation of the cycle stepping motor 181 into Step 9 opens the path to the cycle step motor. Therefore, means must be provided for signaling the end of the major mode voltage comparisons. This is accomplished as follows: As cycle step timer brush 185 moves on to step motor conductor path 270, conductor 271 supplies voltage to slow operating relays 272 and 309 which in turn complete a path to the cycle stepping motor 181. In the interim, the cycle step timer brushes 243, 244, 266 and 267 are engaging the conductor paths 273, 274, 275 and 276 of the cycle step timer, which are connected to the major modes 129 and 133 of the coarse and fine sensing encoders 125 and 126 and the coarse major mode and fine major mode selectors 155 of the program. The voltages from the sensing and program paths 273 and 274 for the major mode are put in opposition across points 277 and 278, which are separated by resistances 279 and 280. Depending on which voltage is the largest, the sensing or the program, the voltage will polarize in lines 281 and 282. The clockwise relay 283 is hooked up to lines 281 and 282 in opposite polarity to the counterclockwise relay 284. So the first relay to operate determines the polarity or direction that the coarse step motor 69 must rotate to move the wheel 24 to its next position.

If a voltage difference is sensed by either the clockwise relay 283 or the counterclockwise relay 284, the top switch 285 or 286 of one of these relays energizes relay 287, and prevents the cycle stepping motor 181 from being energized. Operation of relay 284 also closes switches 288 and 289, and completes a circuit between the coarse step motor power supply 193 and the coarse step motor 69. Likewise, energization of the relay 283 closes switches 290 and 291 and provides power to the step motor 69 in the opposite direction to rotate the motor in the opposite direction.

The fine adjustment motor 96 for wheel 25 is operated by means of a comparison of the voltages of cycle step timer conductor paths 275 and 276, in the same manner through opposition of these voltages across points 300 and 301 to polarize and operate either of clockwise relay 302 or counterclockwise relay 303. The sensing of voltage by either of these relays opens relay 304 in a similar manner and prevents the operation of the cycle step motor 181. As previously described for the coarse step motor, when the difference in voltages drops to zero this relay is deenergized and the switch closed opening a path to the cycle step motor to move the brushes on to the next step.

The last step, which is the comparison of the minor modes, takes place on conductor paths 305, 306, 307 and 308, and is accomplished in the same manner as that previously described for the minor mode. After the completion of this last Step 10, the cycle step motor moves the brushes on to Step 1 on the cycle step timer, and the cycle repeats, until all positions on the program 150 are utilized.

I claim:

1. A braking mechanism adjustable to stop rotation of a shaft at a selectable degree of rotation from a starting position, including:
   a hydraulic brake operatively connected to said shaft,
   a cam and cam operated actuator for said brake mounted for rotation about said shaft,
   means to position said cam and said actuator relative to each other in angular relation about said shaft,
   means to rotate said cam and said actuator into brake actuating engagement with each other upon rotation of said shaft, and at a slower rate of rotation than said shaft,
   a shaft stop and stop engaging arm mounted on wheels located in spaced relationship to each other along the length of the shaft, with one of said wheels fixed to the shaft and the other of said wheels free to rotate about the shaft,
   means to rotate said other wheel about the shaft to position said stop and stop engaging arm relative to each other in angular relation about said shaft,
   said stop engaging arm being mounted for movement into and out of the plane of rotation of said stop, and
   means to move said arm into the plane of rotation of the stop upon engagement of said cam and said actuator to bring the shaft to a complete stop in a preselected position of rotation from a starting position.

2. The structure of claim 1 further characterized in that said hydraulic brake includes:
   a housing adapted to contain a liquid,
   a stator arm and a rotor arm positioned in said housing with one of said arms adapted to be rotated through said liquid relative to the other arm upon rotation of said shaft,
   a passage in one of said arms to permit flow of said liquid therethrough,
   a valve movable to open and close said passage, and
   means connecting said valve and said cam operated actuator to move said valve to close said passage upon engagement of said cam and said actuator.

3. The structure of claim 1 further characterized in that said stop engaging arm has spring means to move said arm into the plane of rotation of said stop and releasable latch means to prevent said arm from moving into the plane of rotation of said stop,
   said means to move said arm into the plane of rotation of the stop includes an arm connected to said cam operated actuator which is adapted to be rotated upon engagement of said cam and said actuator,
   a sleeve is mounted on said shaft for sliding movement relative thereto, and
   means are provided to connect the stop engaging arm and said sleeve to translate rotation of said arm into linear movement of said sleeve,
   said sleeve being positioned to engage and release said latch means upon linear movement thereof due to rotation of said arm upon engagement of said cam and actuator.

4. A mechanism for stopping rotation of a shaft at a pre-selectable interval of rotation from a starting position, including:
   a hydraulic brake for slowing rotation of the shaft,
   means to actuate said hydraulic brake,
   said means being adjustable to automatically actuate said hydraulic brake at any preselected one of a plurality of intervals of rotation of said shaft between a starting position and a stopping position of rotation of said shaft, and
   means to stop rotation of the shaft, said stopping means being adjustable to vary the amount of rotation of the shaft after actuation of the hydraulic brake.

5. The structure of claim 4 further characterized in that said hydraulic brake includes a housing containing liquid, a rotor adapted to move through said liquid upon rotation of said shaft, a passage to permit flow of liquid from one side of said rotor to the opposite side upon movement thereof, at least one valve movable to open and close said passage, and cam and actuator means to move said valve to close said passage.

References Cited
UNITED STATES PATENTS

| | | | |
|---|---|---|---|
| 838,169 | 12/1906 | Coyle | 188—86 |
| 2,843,228 | 7/1958 | Wysor. | |
| 3,097,724 | 7/1963 | Bryant et al. | 188—86 X |
| 3,182,759 | 5/1965 | Kelemen | 188—86 |

BENJAMIN W. WYCHE, III, *Primary Examiner.*